(12) United States Patent
Chun et al.

(10) Patent No.: US 8,351,388 B2
(45) Date of Patent: Jan. 8, 2013

(54) METHOD FOR TRANSMITTING DATA OF COMMON CONTROL CHANNEL

(75) Inventors: Sung-Duck Chun, Gyeonggi-Do (KR); Seung-June Yi, Gyeonggi-Do (KR); Sung-Jun Park, Gyeonggi-Do (KR); Young-Dae Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 144 days.

(21) Appl. No.: 12/682,841

(22) PCT Filed: Oct. 20, 2008

(86) PCT No.: PCT/KR2008/006199
§ 371 (c)(1),
(2), (4) Date: Apr. 13, 2010

(87) PCT Pub. No.: WO2009/054655
PCT Pub. Date: Apr. 30, 2009

(65) Prior Publication Data
US 2010/0226325 A1    Sep. 9, 2010

Related U.S. Application Data

(60) Provisional application No. 60/982,120, filed on Oct. 23, 2007, provisional application No. 60/983,304, filed on Oct. 29, 2007, provisional application No. 61/018,884, filed on Jan. 3, 2008, provisional application No. 61/019,575, filed on Jan. 7, 2008.

(30) Foreign Application Priority Data

Oct. 15, 2008   (KR) .................. 10-2008-0101329

(51) Int. Cl.
*H04W 8/00* (2009.01)

(52) U.S. Cl. ........ 370/329; 370/328; 370/349; 370/469; 370/470; 370/474

(58) Field of Classification Search .................. 370/329, 370/328, 349, 315, 469, 474, 473
See application file for complete search history.

(56) References Cited

U.S. PATENT DOCUMENTS 6,445,917 B1    9/2002    Bark et al.
(Continued)

FOREIGN PATENT DOCUMENTS

CN    1339903    3/2002
(Continued)

OTHER PUBLICATIONS

U.S. Appl. No. 60/976,139 (U.S. Appl. 12/238,810, filed Sep. 26, 2008 claims priority to this Provisional).

(Continued)

*Primary Examiner* — Ricky Ngo
*Assistant Examiner* — Rasheed Gidado
(74) *Attorney, Agent, or Firm* — McKenna Long & Aldridge LLP (57) ABSTRACT

Disclosed is a radio (wireless) communication system providing a radio communication service and a terminal, and more particularly, to a method for exchanging data blocks by a base station and a terminal in an Evolved Universal Mobile Telecommunications System (E-UMTS) or a Long Term Evolution (LTE) system, in which a transmitting side effectively transmits data transmitted via a Common Control Logical Channel to a receiving side, and the receiving side accurately separates unnecessary data from the data received via the Common Control Logical Channel.

3 Claims, 4 Drawing Sheets

U.S. PATENT DOCUMENTS

| | | |
|---|---|---|
| 6,594,240 B1 | 7/2003 | Chuah et al. |
| 6,728,918 B1 | 4/2004 | Ikeda |
| 6,862,450 B2 | 3/2005 | Mikola et al. |
| 7,171,163 B2 | 1/2007 | Terry et al. |
| 7,227,868 B2 | 6/2007 | Inden |
| 7,313,116 B2 | 12/2007 | Lee et al. |
| 7,400,593 B2 | 7/2008 | Choi et al. |
| 7,450,933 B2 | 11/2008 | Kwak et al. |
| 7,486,699 B2 | 2/2009 | Yi et al. |
| 7,525,908 B2 | 4/2009 | Olsson et al. |
| 7,706,410 B2 | 4/2010 | Chun et al. |
| 7,710,930 B2 | 5/2010 | Kwak |
| 7,817,595 B2 | 10/2010 | Wu |
| 7,876,771 B2 | 1/2011 | Bergstrom et al. |
| 7,894,444 B2 | 2/2011 | Lohr et al. |
| 7,978,616 B2 | 7/2011 | Chun et al. |
| 8,027,363 B2 | 9/2011 | Chun et al. |
| 8,031,689 B2 * | 10/2011 | Guo ............................ 370/346 |
| 8,059,597 B2 | 11/2011 | Park et al. |
| 8,081,662 B2 | 12/2011 | Chun et al. |
| 8,130,687 B2 | 3/2012 | Cai et al. |
| 8,160,012 B2 | 4/2012 | Chun et al. |
| 8,190,144 B2 | 5/2012 | Chun et al. |
| 8,203,988 B2 | 6/2012 | Chun et al. |
| 8,243,931 B2 | 8/2012 | Yi et al. |
| 2002/0001314 A1 * | 1/2002 | Yi et al. ........................ 370/469 |
| 2002/0024972 A1 | 2/2002 | Yi et al. |
| 2002/0114280 A1 | 8/2002 | Yi et al. |
| 2002/0122411 A1 | 9/2002 | Zimmerman et al. |
| 2003/0099305 A1 | 5/2003 | Yi et al. |
| 2004/0008659 A1 | 1/2004 | Kim |
| 2004/0076182 A1 | 4/2004 | Wu |
| 2004/0103435 A1 | 5/2004 | Yi et al. |
| 2004/0117860 A1 | 6/2004 | Yi et al. |
| 2004/0148396 A1 | 7/2004 | Meyer et al. |
| 2004/0153852 A1 | 8/2004 | Wu |
| 2004/0184438 A1 | 9/2004 | Terry |
| 2004/0229626 A1 | 11/2004 | Yi et al. |
| 2005/0026597 A1 | 2/2005 | Kim et al. |
| 2005/0039101 A1 | 2/2005 | Torsner |
| 2005/0041681 A1 | 2/2005 | Lee et al. |
| 2005/0042987 A1 | 2/2005 | Lee et al. |
| 2005/0047416 A1 | 3/2005 | Heo et al. |
| 2005/0083943 A1 | 4/2005 | Lee et al. |
| 2005/0096017 A1 | 5/2005 | Kim |
| 2005/0100048 A1 | 5/2005 | Chun et al. |
| 2005/0105499 A1 | 5/2005 | Shinozaki et al. |
| 2005/0118992 A1 | 6/2005 | Jeong |
| 2005/0147040 A1 | 7/2005 | Vayanos et al. |
| 2005/0164683 A1 | 7/2005 | Roberts et al. |
| 2005/0169293 A1 | 8/2005 | Zhang et al. |
| 2005/0192021 A1 | 9/2005 | Lee et al. |
| 2005/0193309 A1 | 9/2005 | Grilli et al. |
| 2005/0201354 A1 | 9/2005 | Hosaka et al. |
| 2005/0213605 A1 | 9/2005 | Kim et al. |
| 2005/0237932 A1 | 10/2005 | Liu |
| 2005/0238051 A1 | 10/2005 | Yi et al. |
| 2005/0254467 A1 | 11/2005 | Li et al. |
| 2005/0259662 A1 | 11/2005 | Kim et al. |
| 2005/0286483 A1 | 12/2005 | Lee et al. |
| 2006/0007886 A1 * | 1/2006 | Lee et al. ...................... 370/329 |
| 2006/0056441 A1 | 3/2006 | Jiang |
| 2006/0067238 A1 | 3/2006 | Olsson et al. |
| 2006/0067364 A1 * | 3/2006 | Jung et al. .................... 370/469 |
| 2006/0072503 A1 | 4/2006 | Kim et al. |
| 2006/0092972 A1 | 5/2006 | Petrovic et al. |
| 2006/0128312 A1 | 6/2006 | Declerck et al. |
| 2006/0142020 A1 | 6/2006 | Mueckenheim et al. |
| 2006/0154603 A1 | 7/2006 | Sachs et al. |
| 2006/0154680 A1 | 7/2006 | Kroth |
| 2006/0165045 A1 | 7/2006 | Kim et al. |
| 2006/0182065 A1 | 8/2006 | Petrovic et al. |
| 2006/0203780 A1 | 9/2006 | Terry |
| 2006/0233200 A1 | 10/2006 | Fifield |
| 2006/0251105 A1 | 11/2006 | Kim et al. |
| 2006/0264179 A1 | 11/2006 | Bonneville et al. |
| 2006/0274690 A1 * | 12/2006 | Chun et al. ................... 370/329 |
| 2006/0280145 A1 | 12/2006 | Revel et al. |
| 2007/0047493 A1 | 3/2007 | Park et al. |
| 2007/0053309 A1 | 3/2007 | Poojary et al. |
| 2007/0060139 A1 | 3/2007 | Kim et al. |
| 2007/0079207 A1 | 4/2007 | Seidel et al. |
| 2007/0081513 A1 | 4/2007 | Torsner |
| 2007/0091810 A1 | 4/2007 | Kim et al. |
| 2007/0097913 A1 | 5/2007 | Hanov |
| 2007/0117579 A1 | 5/2007 | Cai et al. |
| 2007/0183358 A1 | 8/2007 | Cai |
| 2007/0189205 A1 | 8/2007 | Terry et al. |
| 2007/0201397 A1 | 8/2007 | Zhang |
| 2007/0223526 A1 | 9/2007 | Jiang |
| 2007/0258591 A1 | 11/2007 | Terry et al. |
| 2007/0274278 A1 | 11/2007 | Choi et al. |
| 2007/0297360 A1 | 12/2007 | Joachim et al. |
| 2007/0297367 A1 | 12/2007 | Wang et al. |
| 2008/0008152 A1 | 1/2008 | Lohr et al. |
| 2008/0043658 A1 | 2/2008 | Worrall |
| 2008/0045224 A1 | 2/2008 | Lu et al. |
| 2008/0051098 A1 | 2/2008 | Rao |
| 2008/0059859 A1 | 3/2008 | Marinier et al. |
| 2008/0069108 A1 | 3/2008 | Yi et al. |
| 2008/0084851 A1 | 4/2008 | Kim et al. |
| 2008/0089285 A1 * | 4/2008 | Pirskanen et al. ............ 370/329 |
| 2008/0101609 A1 | 5/2008 | Jiang |
| 2008/0165717 A1 | 7/2008 | Chen et al. |
| 2008/0165755 A1 * | 7/2008 | Marinier et al. .............. 370/342 |
| 2008/0182609 A1 | 7/2008 | Somasundaram et al. |
| 2008/0186944 A1 | 8/2008 | Suzuki et al. |
| 2008/0186946 A1 * | 8/2008 | Marinier et al. .............. 370/349 |
| 2008/0198869 A1 | 8/2008 | Jiang |
| 2008/0212561 A1 | 9/2008 | Pani et al. |
| 2008/0233941 A1 | 9/2008 | Jen |
| 2008/0268878 A1 | 10/2008 | Wang et al. |
| 2008/0273482 A1 | 11/2008 | Lee et al. |
| 2008/0310395 A1 | 12/2008 | Kashima |
| 2008/0318566 A1 | 12/2008 | Chun et al. |
| 2008/0318578 A1 | 12/2008 | Worrall |
| 2009/0005058 A1 | 1/2009 | Kazmi et al. |
| 2009/0016301 A1 | 1/2009 | Sammour et al. |
| 2009/0046631 A1 * | 2/2009 | Meylan et al. ................ 370/328 |
| 2009/0046695 A1 | 2/2009 | Jiang |
| 2009/0104890 A1 | 4/2009 | Wang et al. |
| 2009/0116434 A1 | 5/2009 | Lohr et al. |
| 2009/0175163 A1 | 7/2009 | Sammour et al. |
| 2009/0175253 A1 | 7/2009 | Wu et al. |
| 2009/0232076 A1 | 9/2009 | Kuo |
| 2009/0259908 A1 | 10/2009 | Gollapudi |
| 2010/0014466 A1 | 1/2010 | Meyer et al. |
| 2010/0091750 A1 | 4/2010 | Lee et al. |
| 2010/0128648 A1 | 5/2010 | Lee et al. |
| 2010/0142429 A1 | 6/2010 | Yi et al. |
| 2010/0157904 A1 | 6/2010 | Ho et al. |
| 2010/0232335 A1 | 9/2010 | Lee et al. |
| 2011/0019604 A1 | 1/2011 | Chun et al. |
| 2011/0033048 A1 | 2/2011 | Stanwood et al. |
| 2011/0149865 A1 | 6/2011 | Lee et al. |

FOREIGN PATENT DOCUMENTS

| | | |
|---|---|---|
| CN | 1396780 | 2/2003 |
| CN | 1549610 | 11/2004 |
| CN | 1613210 A | 5/2005 |
| CN | 1642067 | 7/2005 |
| CN | 1761260 | 4/2006 |
| CN | 1761356 | 4/2006 |
| CN | 1846365 | 10/2006 |
| CN | 1868157 | 11/2006 |
| CN | 1918825 | 2/2007 |
| CN | 1938969 | 3/2007 |
| CN | 1954521 | 4/2007 |
| CN | 101090281 | 12/2007 |
| EP | 1 263 160 A1 | 12/2002 |
| EP | 1326397 | 7/2003 |
| EP | 1 509 011 A2 | 2/2005 |
| EP | 1 638 237 A2 | 3/2006 |
| EP | 1695462 A1 | 8/2006 |
| EP | 1 768 297 A2 | 3/2007 |
| EP | 2026523 | 2/2009 |
| EP | 2108223 | 10/2009 |

| | | |
|---|---|---|
| JP | 07-162948 | 6/1995 |
| JP | 2000-324161 | 11/2000 |
| JP | 2001-197021 | 7/2001 |
| JP | 2002-198895 | 7/2002 |
| JP | 2003-018050 | 1/2003 |
| JP | 2003-115796 | 4/2003 |
| JP | 2003-115876 | 4/2003 |
| JP | 2003-516021 | 5/2003 |
| JP | 2003-229925 A | 8/2003 |
| JP | 2003-283592 | 10/2003 |
| JP | 2005-073276 | 3/2005 |
| JP | 2006-054718 | 2/2006 |
| JP | 2006-505209 | 2/2006 |
| JP | 2006-505209 A | 2/2006 |
| JP | 2006-51466 | 4/2006 |
| JP | 2006-121562 | 5/2006 |
| JP | 2006-311543 A | 11/2006 |
| JP | 2007-116639 | 5/2007 |
| JP | 2007-312244 | 11/2007 |
| JP | 2008-520125 | 6/2008 |
| JP | 2009-513058 A | 3/2009 |
| JP | 2009-521893 A | 6/2009 |
| KR | 10-2001-0045783 | 6/2001 |
| KR | 10-2003-0087914 A | 11/2003 |
| KR | 10-2004-0072961 | 8/2004 |
| KR | 10-2005-0081836 | 8/2005 |
| KR | 10-2005-0103127 A | 10/2005 |
| KR | 2005-0103127 | 10/2005 |
| KR | 10-2006-004935 | 1/2006 |
| KR | 10-2006-0014910 | 2/2006 |
| KR | 10-2006-0029452 A | 4/2006 |
| KR | 2006-0069378 A | 6/2006 |
| KR | 2006-0079784 A | 7/2006 |
| KR | 10-2007-0076374 | 7/2007 |
| KR | 10-0907978 | 7/2009 |
| KR | 2009-0084756 | 8/2009 |
| RU | 2291594 | 1/2007 |
| RU | 2291594 C2 | 1/2007 |
| RU | 2304348 | 8/2007 |
| TW | 496058 | 7/2002 |
| WO | WO 2001/037473 | 5/2001 |
| WO | WO 2004/042953 | 5/2004 |
| WO | WO 2005/078967 A1 | 8/2005 |
| WO | WO 2005/122441 | 12/2005 |
| WO | WO 2006/009714 | 1/2006 |
| WO | WO 2006/016785 A1 | 2/2006 |
| WO | WO 2006/033521 A1 | 3/2006 |
| WO | WO 2006/052086 | 5/2006 |
| WO | WO 2006/083149 | 8/2006 |
| WO | WO 2006/095385 | 9/2006 |
| WO | WO 2006/104335 A2 | 10/2006 |
| WO | WO 2006/104342 A2 | 10/2006 |
| WO | WO 2006/116620 | 11/2006 |
| WO | WO 2006/118418 | 11/2006 |
| WO | WO 2006/118435 | 11/2006 |
| WO | WO 2007/020070 | 2/2007 |
| WO | WO 2007/023364 | 3/2007 |
| WO | WO 2007/039023 A1 | 4/2007 |
| WO | WO 2007/045505 A1 | 4/2007 |
| WO | WO 2007/052921 | 5/2007 |
| WO | WO 2007/052921 A1 | 5/2007 |
| WO | WO 2007/078155 A2 | 7/2007 |
| WO | WO 2007/078174 A1 | 7/2007 |
| WO | WO 2007/079085 A2 | 7/2007 |
| WO | WO 2007/091831 | 8/2007 |
| WO | WO 2007/147431 | 12/2007 |
| WO | WO 2008/004725 | 1/2008 |
| WO | WO 2008/010063 | 1/2008 |
| WO | WO 2008/094120 | 8/2008 |
| WO | WO 2009/035301 | 3/2009 |

OTHER PUBLICATIONS

U.S. Appl. No. 61/019,058 (U.S. Appl. No. 12/340,033, filed Dec. 19, 2008 claims priority to this Provisional).

LG Electronics Inc: "UE state transition in LTE_Active", R2-061002, 3GPP TSG-RAN WG2 #52; Mar. 27-31, 2006, Athens, Greece. XP-050130928.

Texas Instruments: "UL Synchronization Management and Maintenance in E-UTRA", R1-072198, 3GPP TSG-RAN WG1 #49, May 7-11, 2007 Kobe, Japan. XP050105936.

Texas Instruments: "UL Synchronization Management in LTE_Active", R1-071478, 3GPP TSG RAN WG1 #48 bis, Mar. 26-30, 2007, St. Julians, Malta. XP050105413.

Motorola: "Contention-free Intra-LTE Handover", R2-070730, 3GPP TSG-RAN WG2 #57, Feb. 12-16, 2007, St. Louis, Missouri. XP 050133763.

Ericsson: "Scheduling Request in E-Utran", R1-070471, 3GPP TSG-RAN WG2 #47bis, Jan. 15-19, 2007, Sorrento, Italy. XP50104502.

Ericsson, Nokia Corporation, Nokia Siemens Networks, Qualcomm Europe, Samsung, NTT DoCoMo, Inc, "Framework for scheduling request and buffer status reporting", Nov. 5-9, 2007, TSG-RAN WG2 Meeting #60, R2-074691.

Motorola, "Synchronized Random Access Channel and Scheduling Request", Nov. 6-10, 2006, 3GPP TSG RAN1 #47, R1-063046.

Ericsson, "Basic principles for the scheduling request in LTE", Aug. 28-Sep. 1, 2006, 3GPP TSG RAN WG2 #54, R2-062350.

NTT DoCoMo, Fujitsu, Mitsubishi Electric, NEC, Sharp, Toshiba Corporation, "Scheduling Request Transmission Method for E-Utra Uplink" Nov. 6-10, 2006, 3GPP TSG RAN WG1 Meeting #47, R1-063301.

Digital cellular telecommunications system (Phase 2+); Functional stage 2 description of Location Services (LCS) in GERAN (3GPP TS 43.059 version 7.3.0 Release 7); ETSI TS 143 059 ETSI Standards, LIS, Sophia Antipolis Cedex, France, vol. 3-G1, No. V7.3.0, May 1, 2007, XP014038519.

ZTE: Redundant retransmission restraint in RLC-AM' 3GPP Draft; R2-061234, $3^{RD}$ Generation Partnership Project (3GPP), Mobile Competence Centre; vol. RAN WG2, no. Shanghai, China; 20060503, May 3, 2006, XP050131180.

Nokia, "Uplink Scheduling for VoIP", 3GPP TSG-RAN WG2 Meeting #57, Feb. 12-16, 2007, St. Louis, Missouri. R2-070476, XP008125208.

Nokia, "Buffer Reporting for E-UTRAN", 3GPP TSG-RAN WG2 Meeting #52, Mar. 27-31, 2006, Athens, Greece. R2-060829, XP002503218.

LG Electronics Inc. "Correction of status report coding", 3GPP TSG RAN WG2 #61, Feb. 11-15, 2008, Sorrento, Italy, XP-002624626, R2-080969.

$3^{rd}$ Generation Partnership Project: "Technical Specification Group Radio Access Network, Evolved Universal terrestrial Radio Access (E-UTRA), Packet Data Convergence Protocol (PDCP) specification (Release 8)", 3GPP TS 36.323 V8.2.1, May 2008.

Alcatel-Lucent: "PDCP status report carrying LIS only", 3GPP TSG RAN WG2 #61, Jan. 14-18, 2008, Sevilla, Spain, XP-50138711, R2-080902.

Qualcomm Europe: "Further Details on RACH Procedure", 3GPP TSG-RAN WG1 #48, Feb. 12-16, 2007, St. Louis, Missouri, R1-070649.

NTT DoCoMo, Inc. "Buffer Status Report and Scheduling Request triggers", 3GPP TSG RAN WG2 #59, Aug. 20-24, 2007, Athens, Greece, R2-073574.

"Correction to PDCP Status Report", 3GPP TSG RAN WG2 #61bis, Mar. 24, 2008, R2-081594, XP-002624627.

Ericsson: "Scheduling Request in E-UTRAN", 3GPP TSG-RAN WG2 #47bis, Sorrento, Italy, Jan. 15-19, 2007, R1-070471.

Reuven Cohen: "An improved SSCOP-like Scheme for Avoiding Unnecessary Retransmissions and Achieving Ideal Throughput", Proceedings of IEEE Infocom 1996, Conference on Computer Communications, Fifteenth Annual Joint Conference of the IEEE Computer and communications Societies, Mar. 24-28, 1996, pp. 855-862, XP010158150.

Office Action of Japanese Patent Office in Appl'n No. 2009-551643, dated Dec. 20, 2011.

Office Action of Japanese Patent Office in Appl'n No. 2010-513117, dated Dec. 13, 2011.

Decision on Grant of Russian Patent Office in Appl'n No. 2010115253, dated Dec. 2, 2011.

Decision on Grant of Russian Patent Office in Appl'n No. 2010115272, dated Dec. 2, 2011.

Office Action of the U.S. Patent Office in U.S. Appl No. 12/672,999, dated Dec. 29, 2011.

Office Action of the U.S. Patent Office in U.S. Appl. No. 12/669,022, dated Jan. 12, 2012.
Office Action of Taiwanese Patent Office in Appl'n No. 097123135, dated Nov. 1, 2011.
Office Action of Japanese Patent Office in Appl'n No. 2010-512091, dated Nov. 22, 2011.
Office Action of the U.S. Patent Office in U.S. Appl. No. 12/452,495, dated Oct. 28, 2011.
Office Action of the U.S. Patent Office in U.S. Appl. No. 12/452,733, dated Nov. 9, 2011.
Office Action of the U.S. Patent Office in U.S. Appl. No. 12/452,793, dated Nov. 14, 2011
Office Action of the U.S. Patent Office in U.S. App. No. 12/678,487, dated Nov. 29, 2011.
Office Action of the U.S. Patent Office in U.S. Appl. No. 12/234,574, dated Nov. 4, 2011.
3GPP TS 36.322, V8.0.0, Dec. 2007, $3^{rd}$ Generation Partnership Project; Technical Specification Group Radio Access Network; Evolved Universal Terrestrial Radio Access (E-UTRA) Radio Link Control (RLC) protocol specification (Release 8).
Change Request, Miscellaneous corrections to TS 36.322, 3GPP TSG-RAN2 Meeting #61, Shenzhen, China, Mar. 31-Apr. 4, 2008, R2-081700.
Ericsson: "Clarification to the handling of large RLC status reports", Change Request, 3GPP TSG-RAN2 Meeting #61bis, Shenzhen, China, Mar. 31-Apr. 4, 2008, R2-082018.
LG Electronics et al. "ACK_SN setting for short Status PDU", 3GPP TSG-RAN WG2 #62, May 5-9, 2008, Kansas City, Missouri, R2-082133.
Kashima, Method and Apparatus for Providing Timing Alignment, U.S. Appl. No. 60/944,662 (provisional applications are not published).
Wu et al. Enhanced Random Access Response Formats in E-Utran, U.S. Appl. No. 61/006,348 (provisional applications are not published).
ITRI, "Buffer Status Reporting with Group Combining for LTE", 3GPP TSG RAN WG2, meeting #58bis, Orlando, Florida, Jun. 25-29, 2007, R2-072833.
NEC, "Consideration on Scheduling Information", 3GPP TSG RAN WG2 #59, Athens, Greece, Aug. 20-24, 2007, R2-073556.
ASUSTeK, "On-line recovery of HFN synchronization due to RLC UM SN problem", 3GPP TSG-RAN WG2 meeting #44, Sophia-Antipolis, France, Oct. 4-8, 2004, R2-041940.
Rapporteur (ASUSTeK), "Summary of HFN de-synchronization problem off-line email discussion", 3GPP TSG RAN WG2 #46, Scottsdale, Arizona, Feb. 14-18, 2005, R2-050318.
Agenda item: 7.4, Source: QUALCOMM Europe, Title: Scheduling request mechanism, Document for: Discussion and Decision, 3GPP TSG-RAN WG1 #48bis, Mar. 26-30, 2007, St. Julian, Malta, R1-071276.
Source: Texas Instruments, Title: Scheduling Request and DRX in E-UTRA, Agenda Item: 7.13.2, Document for: Discussion, decision, 3GPP TSG RAN WG1 #49bis, Orlando, USA, Jun. 25-29, 2007, R1-072859.
Change Request, CR-Form-v9.3, 36.300 CR 0004, rev 1, Current version: 8.1.0, 3GPP TSG-RAN2 Meeting #59, Athens, Greece, Jun. 20-24, 2007, R2-073863.
Agenda Item: 5.2.2, Source: Ericsson, Title: SDU Discard, Document for: Discussion, decision, 3GPP TSG-RAN WG2 #59, Athens, Greece, Aug. 20-24, 2007, R2-073230.
Agenda Item: 5.1.1.2, Source: Motorola, Title: MAC Header format, Document for: Discussion/ Decision, 3GPP TSG-RAN2 Meeting #59bis, Shanghai, P.R. China, Oct. 8-12, 2007, R2-074419.

Agenda Item: 5.1.1.2, Source: NTT DoCoMo, Inc., NEC, Title: MAC PDU structure for LTE, Document for: Discussion and Decision, 3GPP TSG RAN WG2 #59bis, Oct. 8-12, 2007, Shanghai, China, R2-074174.
3GPP TS 36.321 V1.0.0 (Sep. 2007), Technical Specification, "$3^{rd}$ Generation Partnership Project; Technical Specification Group radio Access Network; Evolved Universal Terrestrial Radio Access (E-UTRA) Medium Access Control (MAC) protocol specification (Release 8)".
Source: Chairman, Date: Oct. 12, Object: LTE User Plane session report, 3GPP TSG RAN WG2 #59bis, Oct. 8-12, 2008, Shanghai, China, R2-074536.
3GPP TS 25.321 V7.5.0 (Jun. 2007), Technical Specification, "$3^{rd}$ Generation Partnership Project; Technical Specification Group Radio Access Network; Medium Access Control (MAC) protocol specification (Release 7)".
Ericsson, "RLC status report format", TSG-RAN WG2 Meeting #60, Jeju Island, Korea, Nov. 5-9, 2007, R2-074701.
"LTE User Plane Session Report", 3GPP TSG RAN WG2 #59bis, Oct. 8-12, 2008, Shanghai, China, R2-074536.
$3^{rd}$ Generation Partnership Project, "Technical Specification Group Radio Access Network; Medium Access Control (MAC) protocol specification", Release 7, 3GPP TS 25.321, V7.5.0, Jun. 2007.
$3^{rd}$ Generation Partnership Project, "Technical Specification Group Radio Access Network; Evolved Universal Terrestrial Radio Access (E-UTRA) protocol specification", Release 8, 3GPP TS 36.321, V71.0.0, Sep. 2007.
LG Electronics, "Update of eUtran PDCP specification", 3GPP TSG-RAN2, Meeting #61, Sorrento, Italy, 2008, R2-081390.
Ghosh et al. "Random Access Design for UMTS Air-Interface Evolution", Apr. 2007, IEEE.
"Universal Mobile Telecommunications System (UMTS); Radio Link Control (RLC) protocol specification (3GPP TS 25.322 version 4.10.0 Release 4); ETSI TS 125 322", ETSI Standards, LIS, Sophia Antipolis Cedex, France, vol. 3-R2, No. V4.10.0, Sep. 1, 2003, XP014016803.
LG Electronics Inc: "Correction to Polling Procedure", 3GPP Draft; R2-081588 Correction to Polling Procedure, $3^{RD}$ Generation Partnership Project (3GPP), Mobile Competence Centre; 650, Route Des Lucioles; F-06921 Sophia-Anti Polis Cedex; France, vol. RAN WG2, no. Shenzhen, China; 20080324, Mar. 24, 2008, XP050139320.
Jiang, ASUSteK Computer Inc, "HFN de-synchronization detection with Integrity Protection scheme in a wireless communications", U.S. Appl. No. 60/863,800.
Motorola, "Design of backoff scheme for LTE", 3GPP TSG RAN WG2 Meeting #56bis, Sorrento, Italy, Jan. 15-19, 2007, R2-070143.
Alcatel-Lucent, "Format for RACH message 2", 3GPP TSG RAN WG2 Meeting #60bis, Sevilla, Spain, Jan. 14-18, 2008, R2-080176.
MAC Rapporteurs (Ericsson, Qualcomm Europe), "Change Request: E-UTRA MAC protocol specification update", 3GPP TSG RAN WG2 Meeting #60bis, Sevilla, Spain, Jan. 14-18, 2008, R2-080631.

* cited by examiner

R/R/E/LCID sub-header (b)

| Index | LCID values |
|---|---|
| 00001-xxxxx | Identity of the logical channel |
| xxxxx-11010 | Reserved |
| 11011 | CCCH |
| 11100 | UE Contention Resolution Identity |
| 11101 | Timing Advance |
| 11110 | DRX Command |
| 11111 | Padding |

(a)

| Index | LCID values |
|---|---|
| 00000-yyyyy | Identity of the logical channel |
| yyyyy-11010 | Reserved |
| 11011 | CCCH |
| 11100 | Power Headroom Report |
| 11101 | Short Buffer Status Report |
| 11110 | Long Buffer Status Report |
| 11111 | Padding |

(b)

METHOD FOR TRANSMITTING DATA OF COMMON CONTROL CHANNEL

This application is a national phase application based on International Application No. PCT/KR2008/006199, filed on Oct. 20, 2008, which claims priority to U.S. Provisional Application No. 60/982,120, filed on Oct. 23, 2007, U.S. Provisional Application No. 60/983,304, filed on Oct. 29, 2007, U.S. Provisional Application No. 61/018,884, filed on Jan. 3, 2008, U.S. Provisional Application No. 61/019,575, filed on Jan. 7, 2008 and Korean Patent Application No. 10-2008-0101329, filed on Oct. 15, 2008, all of which are incorporated by reference for all purposes as if fully set forth herein.

TECHNICAL FIELD

The present invention relates to a radio (wireless) communication system providing a radio communication service and a terminal, and more particularly, to a method for exchanging data blocks by a base station and a terminal in an Evolved Universal Mobile Telecommunications System (E-UMTS) evolved from the UMTS or a Long Term Evolution (LTE) system, in which a transmitting side effectively transmits data transmitted via a Common Control Logical Channel (CCCH) to a receiving side, and the receiving side accurately separates unnecessary data from the data received via the Common Control Logical Channel.

BACKGROUND ART

Figure 1:
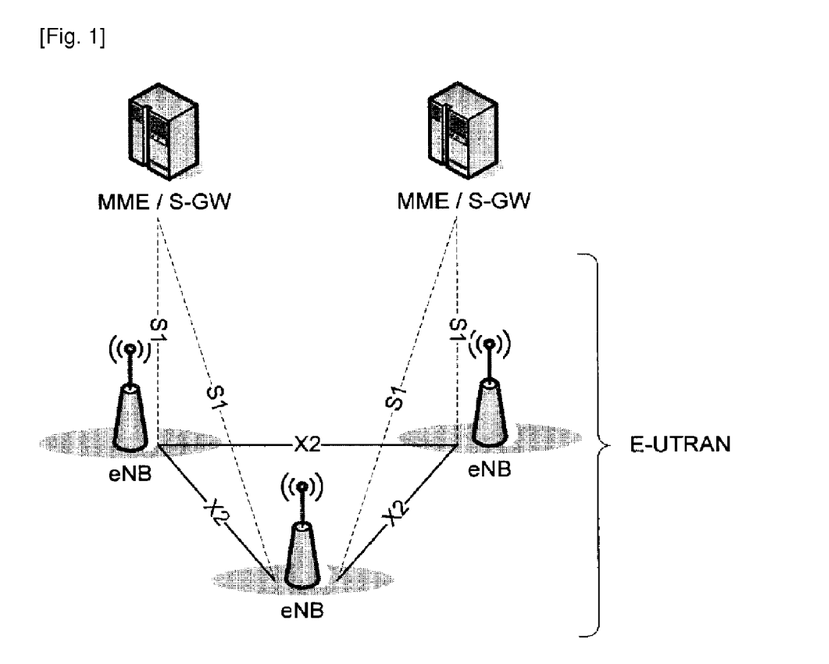
FIG. 1 shows an exemplary network structure of an Evolved Universal Terrestrial Radio Access Network (E-UTRAN) as a mobile communication system to which a related art and the present invention are applied.

FIG. 1 shows an exemplary network structure of an Evolved Universal Mobile Telecommunications System (E-UMTS) as a mobile communication system to which a related art and the present invention are applied. The E-UMTS system is a system that has evolved from the existing UMTS system, and its standardization work is currently being performed by the 3GPP standards organization. The E-UMTS system can also be referred to as a LTE (Long-Term Evolution) system.

The E-UMTS network can roughly be divided into an E-UTRAN and a Core Network (CN). The E-UTRAN generally comprises a terminal (i.e., User Equipment (UE)), a base station (i.e., eNode B), a Serving Gateway (S-GW) that is located at an end of the E-UMTS network and connects with one or more external networks, and a Mobility Management Entity (MME) that performs mobility management functions for a mobile terminal. One eNode B may have one or more cells.

Figure 2:
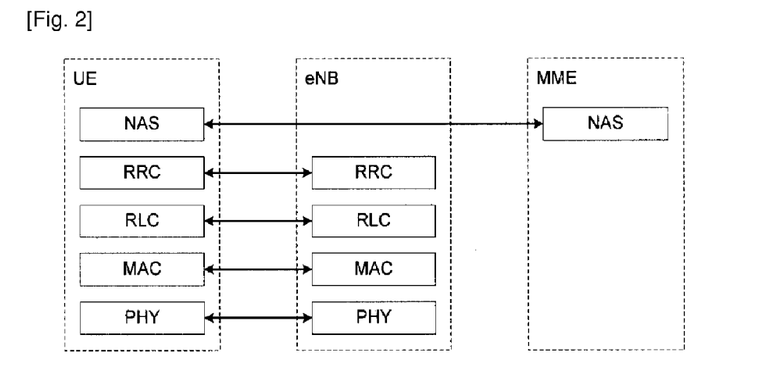
FIG. 2 shows an exemplary view of related art control plane architecture of a radio interface protocol between a terminal and an E-UTRAN.

FIG. 2 shows an exemplary architecture of a radio interface protocol between a terminal and an E-UTRAN (Evolved Universal Terrestrial Radio Access Network) according to the 3GPP radio access network standard. The radio interface protocol is horizontally comprised of a physical layer, a data link layer, and a network layer, and vertically comprised of a user plane for transmitting user data and a control plane for transferring control signaling. The protocol layer may be divided into L1 (Layer 1), L2 (Layer 2), and L3 (Layer 3) based upon the lower three layers of the Open System Interconnection (OSI) standards model that is widely known in the field of communication systems.

Figure 3:
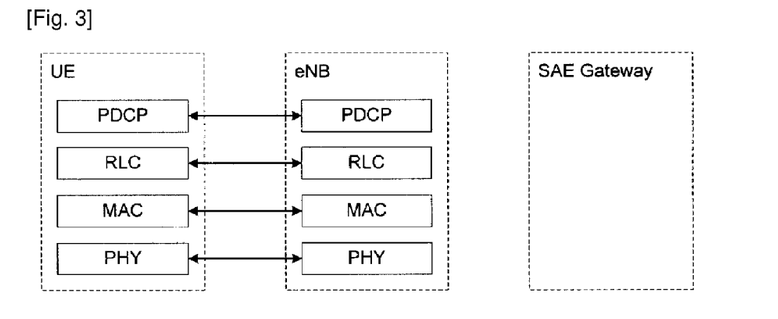
FIG. 3 shows an exemplary view of related art user plane architecture of a radio interface protocol between a terminal and an E-UTRAN.

Hereinafter, particular layers of the radio protocol control plane of FIG. 2 and of the radio protocol user plane of FIG. 3 will be described below.

The physical layer (Layer 1) uses a physical channel to provide an information transfer service to a higher layer. The physical layer is connected with a medium access control (MAC) layer located thereabove via a transport channel, and data is transferred between the physical layer and the MAC layer via the transport channel. Also, between respectively different physical layers, namely, between the respective physical layers of the transmitting side (transmitter) and the receiving side (receiver), data is transferred via a physical channel.

The Medium Access Control (MAC) layer of Layer 2 provides services to a radio link control (RLC) layer (which is a higher layer) via a logical channel. The RLC layer of Layer 2 supports the transmission of data with reliability. It should be noted that if the RLC functions are implemented in and performed by the MAC layer, the RLC layer itself may not need to exist. The PDCP layer of Layer 2 performs a header compression function that reduces unnecessary control information such that data being transmitted by employing Internet Protocol (IP) packets, such as IPv4 or IPv6, can be efficiently sent over a radio interface that has a relatively small bandwidth.

The Radio Resource Control (RRC) layer located at the lowermost portion of Layer 3 is only defined in the control plane, and handles the control of logical channels, transport channels, and physical channels with respect to the configuration, reconfiguration and release of radio bearers (RB). Here, the RB refers to a service that is provided by Layer 2 for data transfer between the mobile terminal and the UTRAN. The RBs refer to a logical path provided by the first and second layers of the radio protocol for data transmission between the terminal and the UTRAN. In general, configuration (or setup) of the RB refers to the process of stipulating the characteristics of a radio protocol layer and a channel required for providing a particular service, and setting the respective detailed parameters and operational methods. An RRC state refers to whether there exists a logical connection to exchange RRC messages between the RRC layer of a specific terminal and the RRC layer of the UTRAN. If there is a connection, the terminal is said to be in RRC connected state. If there is no connection, the terminal is said to be in idle state.

The logical channel is a channel defined between an RLC entity and a MAC entity, and may be divided according to the characteristics of data on the logical channel. The transport channel is a channel defined between the physical layer and the MAC entity, and may be divided according to a transmission scheme in which data on the transport channel is transmitted.

In general, the Common Control Channel (CCCH) is a common control channel, and is used when a terminal sends a message to a base station in a state that the terminal does not have an RRC connection with the base station, or when a terminal sends an RRC message in a state that the terminal has an RRC connection with a certain base station but if a base station to which the terminal is currently accessing is different from the base station having the RRC connection with the terminal. The CCCH is also used when the base station is to send an RRC message to a terminal having no RRC connection with the base station.

On the contrary, in RRC connected state, when the terminal and the base station exchanges control messages (e.g., RRC messages) or user data, a Dedicated Control Channel (DCCH) or Dedicated Traffic Channel (DTCH) is used. In this case, there is a need to effectively distinguish a message transmitted via the CCCH from a message or data transmitted via the DTCH/DCCH. For this, according to the related art, the base station and the terminal use a plurality of Cell Radio Network Temporary Identifiers (C-RNTI) to distinguish the above channels from each other. For instance, when notifying a transmission of the Physical Downlink Shared Channel (PDSCH) or Physical Uplink Shared Channel (PUSCH) via the Physical Downlink Control Channel (PDCCH), a C-RNTI A is used if data of the CCCH via the PDSCH or PUSCH is transmitted, and a C-RNTI B is used if data of the DTCH or DCCH is transmitted. However, this method may cause the waste of power consumption and an increase of complexity, considering that the receiving side should always monitor the plurality of C-RNTIs.

For a terminal having no RRC connection, the C-RNTI is not allocated. In this case, it is difficult to discriminate through the C-RNTI whether data belongs to which logical channel, thereby making it difficult to use the above method.

In addition, for a terminal before having the RRC connection, the terminal does not have any RB established with the base station. On the contrary, a terminal having the RRC connection has several RBs established with the base station. This signifies, from a perspective of the MAC entity serving to handle the mapping of the transport channel and the logical channel, to distinguish contents of each message transmitted/received during the RACH procedure. That is, there is a need to have a method for distinguishing each case based on the perspective of the MAC Protocol Data Unit (PDU).

DISCLOSURE OF INVENTION

Technical Solution

Therefore, an object of the present invention is to provide a method for effectively distinguishing the type of each of data and control messages in a process of exchanging the data and the control messages between a base station and a terminal.

More specifically, the present invention is to provide a method for easily distinguishing CCCH data from non-CCCH data and effectively transmitting the same, in a process which a MAC entity re-generates (or re-configurates) a received MAC PDU into a MAC SDU so as to deliver the same to an upper layer or generates the MAC SDU received from the upper layer into a MAC PDU so as to transmit the same.

To achieve these and other advantages and in accordance with the purpose of the present invention, as embodied and broadly described herein, there is provided a method of generating a protocol data unit (PDU) in wireless communication system, the method comprising: receiving at least one service data unit (SDU) from an upper layer via a common logical channel; adding a header to the received SDUs to generate the protocol data unit (PDU), wherein the header includes at least one field, wherein the at least one field is used to indentify a logical channel or used to identify a type of control information; setting the at least one field to indicate that the at least one SDUs included in the generated PDU were received from the common logical channel; and delivering the generated PDU to a lower layer.

Preferably, the common logical channel is a common control channel (CCCH).

Preferably, the at least one field is a logical channel ID (LCID) field.

Preferably, the at least one field is set with a special value.

Preferably, the special value is set with 00000.

Preferably, the special value is set to indicate a common control channel (CCCH).

Preferably, a size of the at least one field is 5 bits.

Preferably, the PDU is a Medium Access Control (MAC) PDU and the at least one SDU is a MAC SDU.

Preferably, the at least one field is used for each MAC SDU, MAC control element or padding included in a MAC PDU.

MODE FOR THE INVENTION

One aspect of the present invention is the recognition by the present inventors regarding the problems and drawbacks of the related art described above and explained in more detail hereafter. Based upon such recognition, the features of the present invention have been developed.

The present invention is applied to a 3GPP communication technique, in particular, a Universal Mobile Telecommunications system, communication apparatus and communication method. However, without being limited to this, the present invention can be applied to all the wired/wireless communications to which the technical features of the present invention are applicable.

The present invention conceptually relates to a method of generating a protocol data unit (PDU) in a wireless communication system which exchanges data blocks or data units between a base station and a terminal, the method comprising: receiving at least one service data unit (SDU) from an upper layer via a common logical channel; adding a header to the received SDUs to generate the protocol data unit (PDU), wherein the header includes at least one field, wherein the at least one field is used to indentify a logical channel or used to identify a type of control information, setting the at least one field to indicate that the at least one SDUs included in the generated PDU were received from the common logical channel, delivering the generated PDU to a lower layer, and a wireless communication terminal capable of performing such method.

Hereinafter, description of structures and operations of the preferred embodiments according to the present invention will be given with reference to the accompanying drawings.

Figure 4:
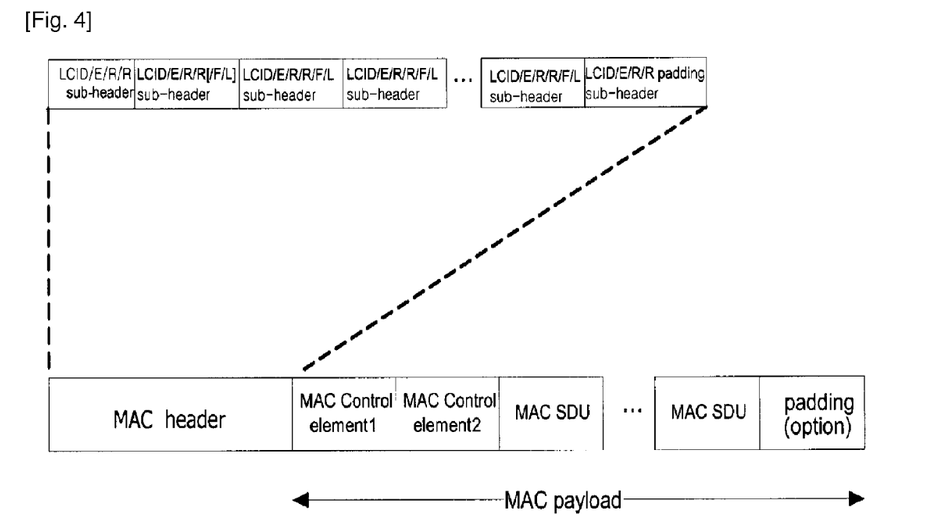
FIG. 4 illustrates an exemplary Protocol Data Unit (PDU) format used in Medium Access Control (MAC) entity.
Figure 5:
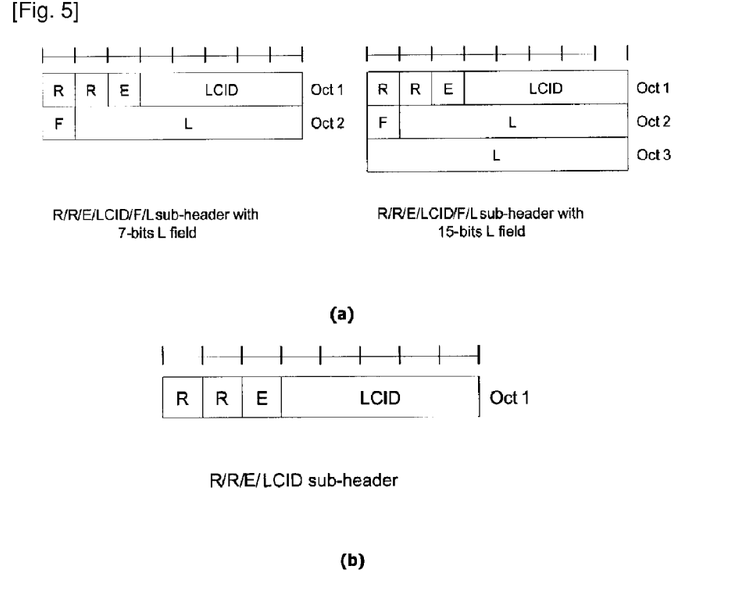
FIGS. 5a and 5b illustrate exemplary MAC sub-header formats used in MAC entity.

FIG. 4 illustrates an exemplary MAC Protocol Data Unit (PDU) format used in Medium Access Control (MAC) entity. As shown in FIG. 4, the Logical Channel ID (LCID) field identifies a logical channel instance of a corresponding MAC SDU, and the Length (L) field indicates a length of the corresponding MAC SDU in bytes. The Extension (E) field indicates whether or not more fields are present in a header. In the above process, if a size of the corresponding MAC SDU or MAC Control Element is less than or equal to 127, 7-bits L field as shown in FIG. 5 may be used. If the size of the corresponding MAC SDU or MAC Control Element is greater than 127, 15-bits L field as shown in FIG. 5 may be used. And, a MAC sub-header as shown in FIG. 5(b) may be used for a MAC sub-header of the MAC SDU included in the MAC PDU or a fixed size MAC Control Element. A MAC sub-header as shown in FIG. 5(a) may be used for other cases.

Next, descriptions of each field used in FIG. 4 will be given in more detail.

LCID: indicates the type of logical channel data of the corresponding MAC SDU or the type of data contained in the corresponding MAC Control Element (MAC CE).

E: indicates whether or not another MAC sub-header is subsequent to the current MAC sub-header.

Format (F): indicates a length of the subsequent L field.

Reserved (R): denotes a reserved bit and is an unused bit.

Here, information related to the LCID values will be shown as below.

TABLE 1

LCID values for DL-SCH

| Index | LCID values |
| --- | --- |
| 00001-xxxxx | Identity of the logical channel |
| xxxxx-11011 | Reserved |
| 11100 | UE Contention Resolution Identity |
| 11101 | Timing Advance |
| 11110 | DRX Command |
| 11111 | Padding |

TABLE 2

LCID values for UL-SCH

| Index | LCID values |
| --- | --- |
| 00000-yyyyy | Identity of the logical channel |
| yyyyy-11011 | Reserved |
| 11100 | Power Headroom Report |
| 11101 | Short Buffer Status Report |
| 11110 | Long Buffer Status Report |
| 11111 | Padding |

Hereinafter, description of an RRC state of a terminal and a RRC connection method will be given in detail. The RRC state refers to whether the RRC of the terminal is logically connected to the RRC of the E-UTRAN, thereby forming a logical connection with the RRC of the E-UTRAN. If the RRC of the terminal forms a logical connection with the RRC of the E-UTRAN, this is referred to as an "RRC connected state". Conversely, if there is no logical connection between the RRC of the terminal and the RRC of the E-UTRAN, this is referred to as an "RRC idle state." When the terminal is in the RRC connected state and, accordingly, the E-UTRAN can recognize the existence of the corresponding terminal according to units of cells, the E-UTRAN can effectively control the terminal. On the other hand, the E-UTRAN cannot recognize a terminal that is in idle state. The terminal in idle state can be managed by the core network according to units of location areas or units of tracking areas, which are areas larger than the cell. Here, the tracking area is a set of cells. Specifically, the existence of a terminal in idle state is only recognized according to units of large areas, such as location areas or tracking (routing) areas, and the terminal must transit into the connected state in order to receive typical mobile communication services such as voice or data.

When a user initially turns on the power of the terminal, the terminal firstly may detect an appropriate cell and maintains its status in an idle state at this cell. The terminal in idle state forms an RRC connection with the RRC of the E-UTRAN through the RRC connection procedure and transits into the RRC connected state when the RRC connection needs to be formed. There are several instances in which a terminal in idle state is required to form the RRC connection. For example, an uplink data transmission may be required due to a call attempt by a user or the transmission of a response message in response to a paging message received from the E-UTRAN may be required.

Figure 6:
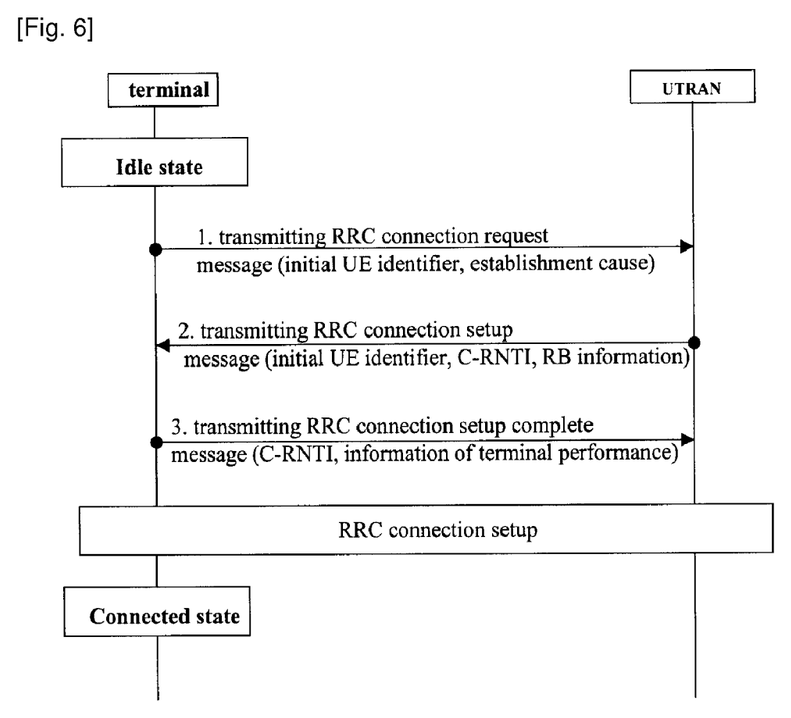
FIG. 6 shows an exemplary RRC connection procedure between a terminal and a network.

In order for a terminal in idle state to form an RRC connection with the E-UTRAN, the RRC connection procedure as described above should be performed. The RRC connection procedure is mainly comprised of three steps of transmitting, by the terminal, an RRC connection request message to the E-UTRAN, transmitting, by the E-UTRAN, an RRC connection setup message to the terminal, and transmitting, by the terminal, an RRC connection setup complete message to the E-UTRAN. Such RRC connection procedure is shown in FIG. 6.

More specifically, if the terminal in idle state needs to form an RRC connection due to a call attempt or a response to a paging from the E-UTRAN, the terminal may transmit an RRC connection request message to the E-UTRAN (Step 1). Here, the RRC connection request message may include an initial UE identifier, an RRC establishment cause, and the like. The initial UE identifier is a terminal unique identifier, and serves to identify a corresponding terminal in any regions all over the world. There are several RRC establishment causes, including a call attempt or a response to a paging. Upon transmitting the RRC connection request message, the terminal may activate a timer. If the terminal fails to receive an RRC connection setup message or an RRC connection reject message from the E-UTRAN until the timer expires, the terminal would re-transmit the RRC connection request message. A maximum number of transmissions of the RRC connection request message may be limited to a specific value.

Upon receiving the RRC connection request message from the terminal, the E-UTRAN may accept the RRC connection request of the terminal if radio resources are sufficient enough, and may transmit an RRC connection setup message as a response message to the terminal (Step 2). Here, the RRC connection setup message is transmitted by including a Cell Radio Network Temporary Identifier (C-RNTI) and RB setup information together with the initial UE identifier. The C-RNTI is an UE identifier, which is allocated by the E-UTRAN, to identify a terminal in connected state. The C-RNTI may be used only when there is an RRC connection and only within the E-UTRAN. After forming the RRC connection, the terminal may communicate with the E-UTRAN using the C-RNTI, instead of using the initial UE identifier. This is because the initial UE identifier is the terminal unique identifier, therefore if this is frequently used, it may be leaked. Accordingly, due to a security reason, the initial UE identifier may be temporarily used during the RRC connection procedure only, the C-RNTI may be used instead after the RRC connection procedure.

Having received the RRC connection setup message, the terminal may compare the initial UE identifier included in the message with its own identifier, and may check whether or not the received message is transmitted for the terminal itself. Based on the checked result, if the message is transmitted to the terminal, the terminal may store a C-RNTI allocated by the E-UTRAN, and then may transmit an RRC connection setup complete message to the E-UTRAN by using the C-RNTI (Step 3). Here, the RRC connection setup complete message includes information of terminal performance. If the terminal successfully transmits the RRC connection setup message, the terminal forms the RRC connection with the E-UTRAN and moves to the RRC connected state.

Hereinafter, descriptions of a Random Access Channel (RACH) through which a terminal transmits an initial control message to a network will be given in more detail. In general, there are several reasons to use the RACH: for time synchronization of a terminal with a network, and for acquiring radio resources when the terminal needs an uplink data transmission but there is no uplink radio resources to transmit such data. For instance, the terminal is turned on to initially access to a new cell. In this case, the terminal would perform downlink synchronization and receive system information of a cell desiring to access. After receiving the system information, the terminal should transmit an RRC connection request message for the RRC connection. However, the terminal is not time-synchronized with a current network and also does not acquire uplink radio resources. Accordingly, the terminal may use the RACH to request radio resources for transmitting the RRC connection request message to the network. The base station, having received the request for corresponding radio resources, may allocate appropriate radio resources to the terminal. Then, the terminal may transmit the RRC connection request message to the network using the radio resources. In another example, it is assumed that the terminal has an RRC connection with the network. In this case, the terminal may receive radio resources depending on radio resource scheduling of the network, and may transmit data to the network through the radio resources. However, if there were no data to be transmitted in a buffer of the terminal, the network would not further allocate uplink radio resources to the terminal. This is because it is inefficient to allocate the uplink radio resources to the terminal, which does not have data to be transmitted. Here, a buffer state of the terminal may be reported to the network periodically or upon occurrence of event. If new data to be transmitted is presently existed in the buffer of the terminal having no radio resources, the terminal would use the RACH since it has no allocated uplink radio resources. That is, the terminal may use the RACH to request the radio resources required for data transmission from the network.

Figure 7:
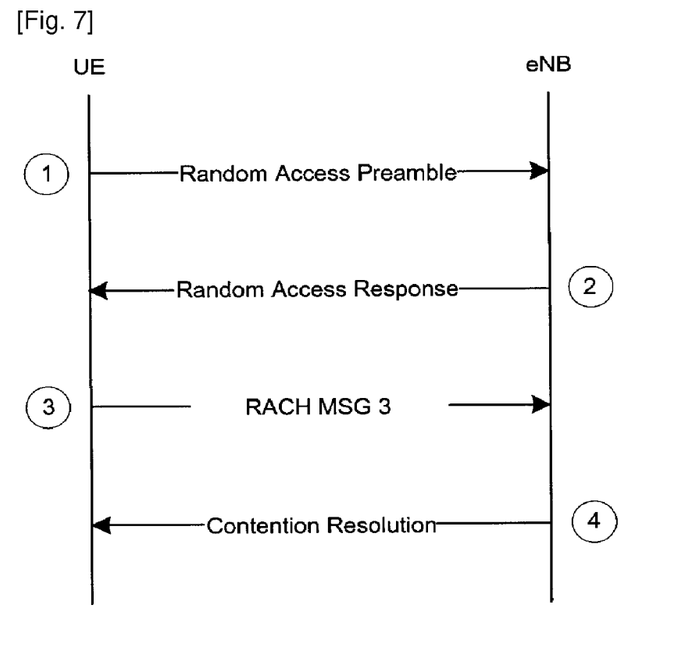
FIG. 7 shows an exemplary initial connection procedure of a terminal.

FIG. 7 shows an exemplary initial connection procedure of a terminal. As shown in FIG. 7, a terminal may select an available Random Access Signature and a Random Access Occasion through system information received from a base station through an RRC signal, and then may transmit a Random Access Preamble (hereinafter, refer to as message 1) to the base station (Step 1). After successfully receiving the random access preamble of the terminal, the base station transmits a Random Access Response (hereinafter, refer to as message 2) to the terminal (Step 2). Here, the random access response may include a Time Advance (TA) which is uplink time synchronization information with the base station, an initial grant which is information regarding an uplink radio resource allocation of an identifier C-RNTI to be used in a corresponding cell, and the like. After receiving the random access response, the terminal may generate and transmit a MAC PDU (hereinafter, refer to as message 3) according to information related to the radio resource allocation included in the random access response information (Step 3). Depending on the message 3 received from the terminal, the base station may allocate radio resources or may transmit the RRC message (Step 4).

In general, the base station and the terminal may transmit or receive data through a physical channel Physical Downlink Shared Channel (PDSCH) using a transport channel DL-SCH, with the exception of a specific control signal or a particular service data. Also, information on which terminal (or a plurality of terminals) should receive data of the PDSCH and information on how the terminals should receive the PDSCH data and perform decoding, are transmitted by being included in the physical channel Physical Downlink Control Channel (PDCCH).

For instance, it is assumed that a certain PDCCH is under CRC masking as an "A" RNTI (Radio Network Temporary Identifier), and is being transmitted in a certain subframe by including information about data being transmitted in transfer format information "C" (e.g., a transport block size, modulation and coding information, etc.) through radio resources "B" (e.g., a frequency location). Under such condition, one or more terminals in a corresponding cell may monitor the PDCCH by using their own RNTI information. If there are one or more terminals having A RNTI at a corresponding point of time, the terminals shall receive the PDCCH, and through information of the received PDCCH, also receive a PDSCH indicated by B and C.

As described above, the present invention is to provide a method for effectively distinguishing the type of each of data and control messages in a process of exchanging the data and the control messages between the base station and the terminal. In particular, the present invention is to provide a method for easily distinguishing CCCH data from non-CCCH data and effectively transmitting the same, in a process which a MAC entity re-generates a received MAC PDU into a MAC SDU so as to deliver the same to an upper layer or generates the MAC SDU received from the upper layer into a MAC PDU so as to transmit the same.

For this, the present invention proposes, if the terminal transmits data of the common control logical channel, to set an LCID field of a MAC sub-header of data with a special value for transmission when the MAC entity of the terminal generates the MAC PDU by using the data.

In addition, the present invention proposes, if the terminal transmits data of the non-common control logical channel, to set the LCID field of the MAC sub-header of data with a special value for a logical channel related to the data when the MAC entity of the terminal generates the MAC PDU by using the data. Here, the set value for the logical channel may be notified by the base station to the terminal through the RRC message while the RRC connection setup procedure or the call setup procedure is performed.

More specifically, in the present invention, when the terminal transmits the MAC PDU via the RACH message 3 described in FIG. 7, if the RRC message is included in the MAC PDU and the terminal is not in RRC connected mode yet, the terminal may set the LCID field in the MAC PDU header with a special value and may transmit the same. In addition, during the above process, the special value may indicate that data included in the MAC PDU including the LCID is the CCCH data. That is, the present invention does not set the LCID field used for the CCCH message transmission with a unique value to each terminal, but uses a fixed value applied to all terminals. In addition, the present invention proposes to use the LCID field to notify the type of a logical channel of data being transmitted. That is, the LCID field is not used to determine whether it is DCCH data or non-DCCH data, but is at least used to know whether or not it is CCCH data.

The present invention considers that, in the RACH procedure, radio resources for transmitting the RACH message 3 is not allocated to a specific terminal (i.e., the RNTI allocated only to a specific terminal), but allocated by using an RNTI, which can be simultaneously used by a plurality of terminals. Therefore, if the radio resources are allocated using the RNTI shared by a plurality of terminals, instead of a terminal-dedicated RNTI, It is proposed to include an LCID having been set with a special value in the MAC PDU header in order to indicate the RRC message included in the MAC PDU. During the above procedure, the special value used to indicate the CCCH may be notified through system information or determined to be a fixed value.

In addition, the present invention proposes, when the MAC PDU is transmitted through the RACH message 3 in the RACH procedure, to have a MAC PDU format different from a MAC PDU format used in other cases. That is, there are cases to use radio resources allocated to a specific terminal only or radio resources allocated by using an RNTI for a specific terminal, and not to use such radio resources. In such cases, different MAC PDU formats are used. Additionally, when a preamble allocated only to a specific terminal is used, i.e., when a dedicated preamble is used in the RACH message 1, and if the MAC PDU included in the RACH message 3 includes the RRC message, the LCID for indicating the RACH message uses a value set to the terminal through the RRC message. In addition, in order for a receiving side MAC entity to easily determine the presence of CCCH data in the received MAC PDU, it is proposed to include a format indicator in the MAC PDU header. That is, the format indicator may indicate whether or not the data included in the MAC PDU is the CCCH data. The CCCH LCID may indicate to the receiving side MAC entity whether data included in the received MAC PDU should be processed by the receiving side MAC entity or the RRC entity.

Figure 8:
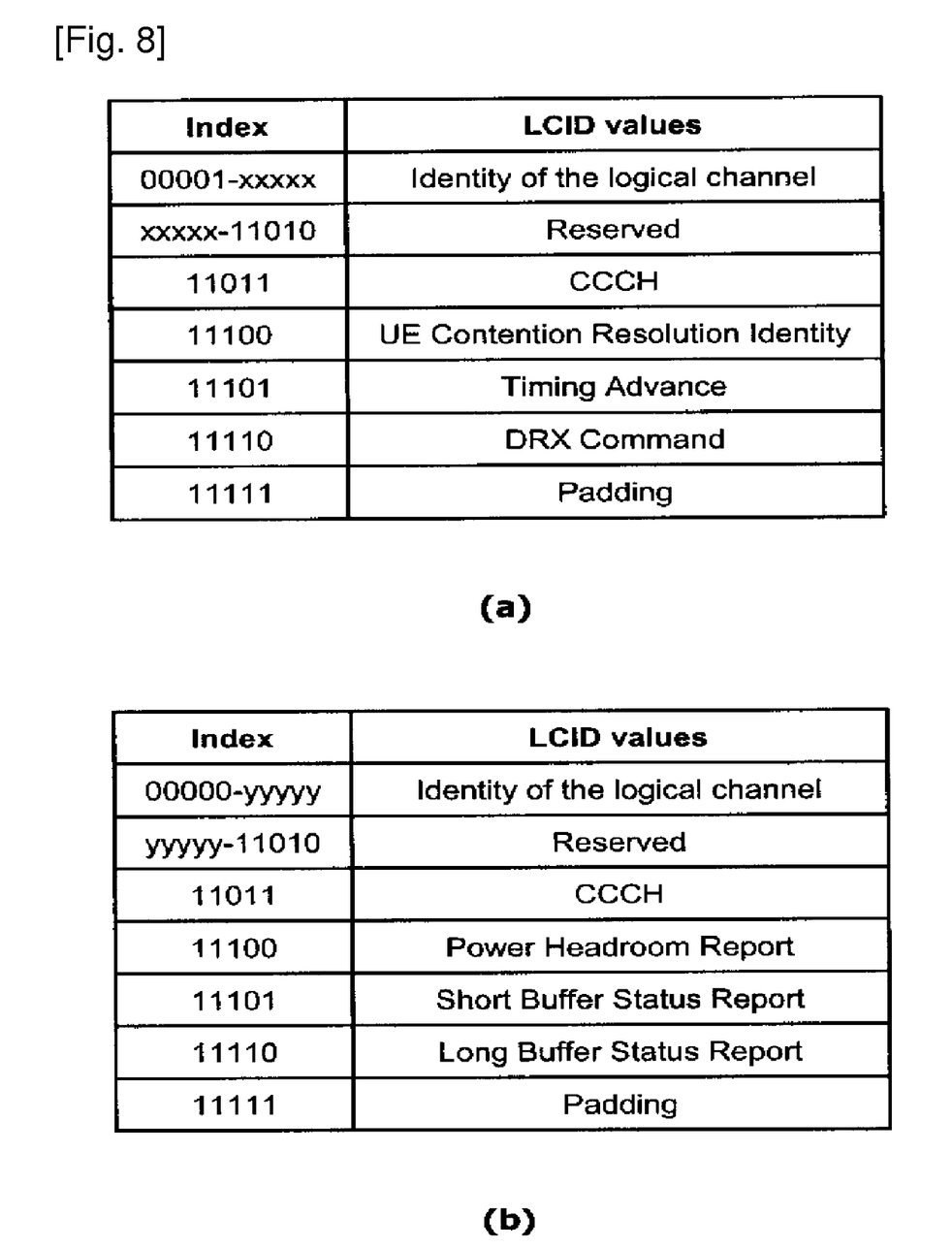
FIGS. 8a and 8b illustrate exemplary LCID fields of a MAC sub-header used according to the present invention.

FIGS. 8a and 8b illustrate exemplary LCID fields of a MAC sub-header used according to the present invention. FIG. 8a illustrates LCID values for DL-SCH, and FIG. 8b illustrates LCID values for UL-SCH. In FIGS. 8a and 8b, indexes for indicating the CCCH are included, and one LCID field may exist for each MAC SDU, MAC control element or padding included in the MAC PDU. Here, a size of the LCID field is 5 bits.

The present invention has an effect of increasing data transmission efficiency without causing power consumption by providing a method for effectively transmitting common control logical channel information when the MAC entity generates the MAC PDU.

The present invention may provide a method of generating a protocol data unit (PDU) in wireless communication system, the method comprising: receiving at least one service data unit (SDU) from an upper layer via a common logical channel; adding a header to the received SDUs to generate the protocol data unit (PDU), wherein the header includes at least one field, wherein the at least one field is used to identify a logical channel or used to identify a type of control information; setting the at least one field to indicate that the at least one SDUs included in the generated PDU were received from the common logical channel; and delivering the generated PDU to a lower layer, wherein the common logical channel is a common control channel (CCCH), the at least one field is a logical channel ID (LCID) field, the at least one field is set with a special value, the special value is set with 00000, the special value is set to indicate a common control channel (CCCH), a size of the at least one field is 5 bits, the PDU is a Medium Access Control (MAC) PDU and the at least one SDU is a MAC SDU, the at least one field is used for each MAC SDU, MAC control element or padding included in a MAC PDU.

Although the present invention is described in the context of mobile communications, the present invention may also be used in any wireless communication systems using mobile devices, such as PDAs and laptop computers equipped with wireless communication capabilities (i.e. interface). Moreover, the use of certain terms to describe the present invention is not intended to limit the scope of the present invention to a certain type of wireless communication system. The present invention is also applicable to other wireless communication systems using different air interfaces and/or physical layers, for example, TDMA, CDMA, FDMA, WCDMA, OFDM, EVDO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of generating a protocol data unit (PDU) in wireless communication system, the method comprising:
    receiving at least one service data unit (SDU) from an upper layer via a common logical channel,
        wherein the common logical channel is a common control channel (CCCH);
    adding a header to the received SDUs to generate the protocol data unit (PDU),
        wherein the header includes at least one field, and
        wherein the at least one field identifies a logical channel of the received service data unit (SDU) or a type of control element (CE), setting the at least one field to indicate that the at least one SDUs included in the generated PDU were received from the common control channel (CCCH),
        wherein an index within the at least one field is set with a special value to indicate the common control channel (CCCH),
        wherein the at least one field is a logical channel ID (LCID) field,
        wherein the index within the at least one field has a size of 5 bits, and
        wherein the at least one field is used for each MAC SDU, MAC control element or padding included in a MAC PDU; and
    delivering the generated PDU to a lower layer.

2. The method of claim 1, wherein the special value is set with 00000.

3. The method of claim 1, wherein the PDU is a Medium Access Control (MAC) PDU and the at least one SDU is a MAC SDU.

* * * * *